US012739913B2

(12) United States Patent
Chu et al.

(10) Patent No.: US 12,739,913 B2
(45) Date of Patent: Sep. 15, 2026

(54) HANDSHAKE FOR SMOOTH ROAMING

(71) Applicant: NXP USA, Inc., Austin, TX (US)

(72) Inventors: Liwen Chu, San Ramon, CA (US); Kiseon Ryu, San Diego, CA (US); Hongyuan Zhang, Fremont, CA (US); Huizhao Wang, San Jose, CA (US)

(73) Assignee: NXP USA, Inc., Austin, TX (US)

( * ) Notice: Subject to any disclaimer, the term of this patent is extended or adjusted under 35 U.S.C. 154(b) by 217 days.

(21) Appl. No.: 18/499,783

(22) Filed: Nov. 1, 2023

(65) Prior Publication Data

US 2025/0048464 A1 Feb. 6, 2025

Related U.S. Application Data

(60) Provisional application No. 63/381,798, filed on Nov. 1, 2022, provisional application No. 63/516,815, filed on Jul. 31, 2023.

(51) Int. Cl.
*H04W 76/15* (2018.01)
*H04W 36/08* (2009.01)
*H04W 88/10* (2009.01)

(52) U.S. Cl.
CPC .......... *H04W 76/15* (2018.02); *H04W 36/08* (2013.01); *H04W 88/10* (2013.01)

(58) Field of Classification Search
CPC .............................. H04W 76/15; H04W 36/08
See application file for complete search history.

(56) References Cited

U.S. PATENT DOCUMENTS

| | | | | |
|---|---|---|---|---|
| 2021/0211871 | A1 | 7/2021 | Chu et al. | |
| 2022/0022033 | A1 | 1/2022 | Ho et al. | |
| 2022/0225200 | A1* | 7/2022 | Smith | H04L 1/1614 |
| 2023/0180106 | A1* | 6/2023 | Ding | H04W 48/12 370/328 |
| 2024/0007896 | A1 | 1/2024 | Ryu et al. | |
| 2024/0073739 | A1 | 2/2024 | Katar et al. | |
| 2024/0089891 | A1 | 3/2024 | Kneckt et al. | |
| 2024/0090056 | A1 | 3/2024 | Kneckt et al. | |
| 2024/0138007 | A1 | 4/2024 | Chu et al. | |
| 2024/0236639 | A1 | 7/2024 | Chu et al. | |
| 2024/0314871 | A1* | 9/2024 | Lu | H04W 76/15 |

(Continued)

OTHER PUBLICATIONS

Brian Hart et al., "A Perspective on Proposed Ultra-High Reliability (UHR) Features for Enterprises Use Cases," Sep. 11, 2022, doc.: IEEE 802.11-22/1580r1.

(Continued)

*Primary Examiner* — Justin Y Lee

(57) ABSTRACT

Roaming for a non-access point (non-AP) device with a roaming access point (AP) multi-link device (MLD), wherein the roaming AP MLD includes a plurality of AP MLDs in different devices at different locations having one medium access control (MAC) service access point (SAP), including: exchanging management frames between the non-AP device and a current serving AP MLD that is one of the plurality of AP MLDs to select a future serving AP MLD that is one of the plurality of AP MLDs and to select future serving link of the future serving AP MLD; and exchanging management frames between the non-AP device and the serving AP MLD to switch from the current serving AP MLD and the future serving AP MLD.

17 Claims, 10 Drawing Sheets

(56) References Cited

U.S. PATENT DOCUMENTS

2024/0365103 A1 10/2024 Chu et al.
2025/0106613 A1 3/2025 Chu et al.

OTHER PUBLICATIONS

Prepared by the 802.11 Working Group of the LAN/MAN StandardsC Committee of the IEEE Computer Society, "Draft Standard for Information Technology—Tele-communications and Information Exchange Between Systems Local and Metropolitan Area Networks—Specific Requirements; Part 11: Wireless LAN Medium Access Control (MAC) and Physical Layer (PHY) Specifications," New York, New York, Jul. 2023, doc.: IEEE P802.11be/D4.0.
Ajami, Abdel, "Thoughts on Predictable QoS in 11bn," IEEE 802.11-24/xxxxr0, Mar. 2024, 10 pages.
James Yee, et al., "Multi AP Coordination and Residential Wi-Fi;" Sep. 13, 2022; doc: 11-22-1512-00-0uhr.
U.S. Appl. No. 19/188,569, Chu et al., "Seamless Roaming in a Wireless Network," filed Apr. 24, 2025, 37 pages.
Non-Final Office Action for U.S. Appl. No. 18/491,451, mailed Feb. 24, 2026, 45 pages.
Ex parte Quayle for U.S. Appl. No. 18/409,618, mailed Jan. 15, 2026, 24 pages.
Notice of Allowance for U.S. Appl. No. 18/409,618, mailed Apr. 22, 2026, 18 pages.

* cited by examiner

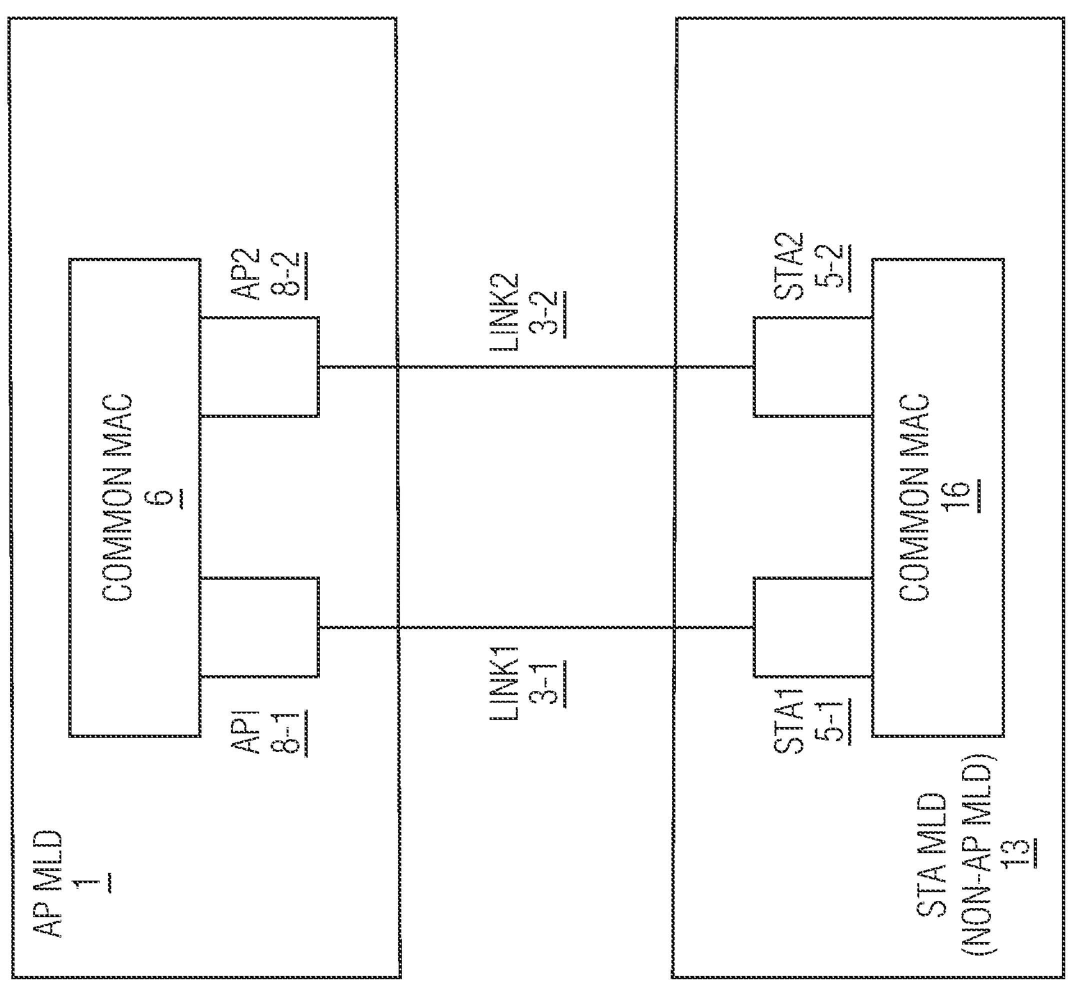
FIG. 1

| | VALIDITY INTERVAL 512 | BSS TERMINATION DURATION (OPTIONAL) 514 | SESSION INFORMATION URL (OPTIONAL) 516 | BSS TRANSITION CANDIDATE LIST ENTRIES (OPTIONAL) 518 |
|---|---|---|---|---|
| OCTETS: | 1 | 0 OR 12 | VARIABLE | VARIABLE |

| SUBELEMENT ID | NAME | EXTENSIBLE |
|---|---|---|
| • • • | | |
| 199 | EHT CAPABILITIES | YES |
| 200 | EHT OPERATION | YES |
| 201 | BASIC MULTI-LINK | YES |
| 202-220 | RESERVED | |
| | | |

| ORDER | MEANING |
|---|---|
| 1 | CATEGORY |
| 2 | PROTECTED EHT ACTION |
| 3 | DIALOG TOKEN |
| 4 | RECONFIGURATION MULTI-LINK ELEMENT (SEE 9.4.2.312.4 (RECONFIGURATION MULTI-LINK ELEMENT)) |
| 5 | OCI ELEMENT (SEE 9.4.2.235 (OCI ELEMENT) |

702, 704, 706, 708, 710

| ORDER | MEANING |
|---|---|
| 1 | CATEGORY |
| 2 | PROTECTED EHT ACTION |
| 3 | DIALOG TOKEN |
| 4 | COUNT |
| 5 | RECONFIGURATION STATUS LIST |
| 6 | GROUP KEY DAT (OPTIONAL) |
| 7 | OCI ELEMENT (SEE 9.4.2.235 (OCI ELEMENT)) (OPTIONAL) |
| 8 | BASIC MULTI-LINK ELEMENT (SEE 9.4.2.312.2 (BASIC MULTI-LINK ELEMENT)) (OPTIONAL) |

802 804 806 808 810 812 814 816

| | ELEMENT ID 902 | LENGTH 904 | ELEMENT ID EXTENSION 906 | MULT-LINK CONTROL 908 | COMMON INFO 910 | LINK INFO 912 |
|---|---|---|---|---|---|---|
| OCTETS: | 1 | 1 | 1 | 2 | VARIABLE | VARIABLE |

| | B4 | B5 | B6 | B7 B11 |
|---|---|---|---|---|
| | MLD CAPABILITIES AND OPERATIONS PRESENT 924 | AP MLD ID PRESENT 926 | EXTENDED MLD CAPABILITIES AND OPERATIONS PRESENT 928 | RESERVED 930 |
| BITS: | 1 | 1 | 1 | 5 |

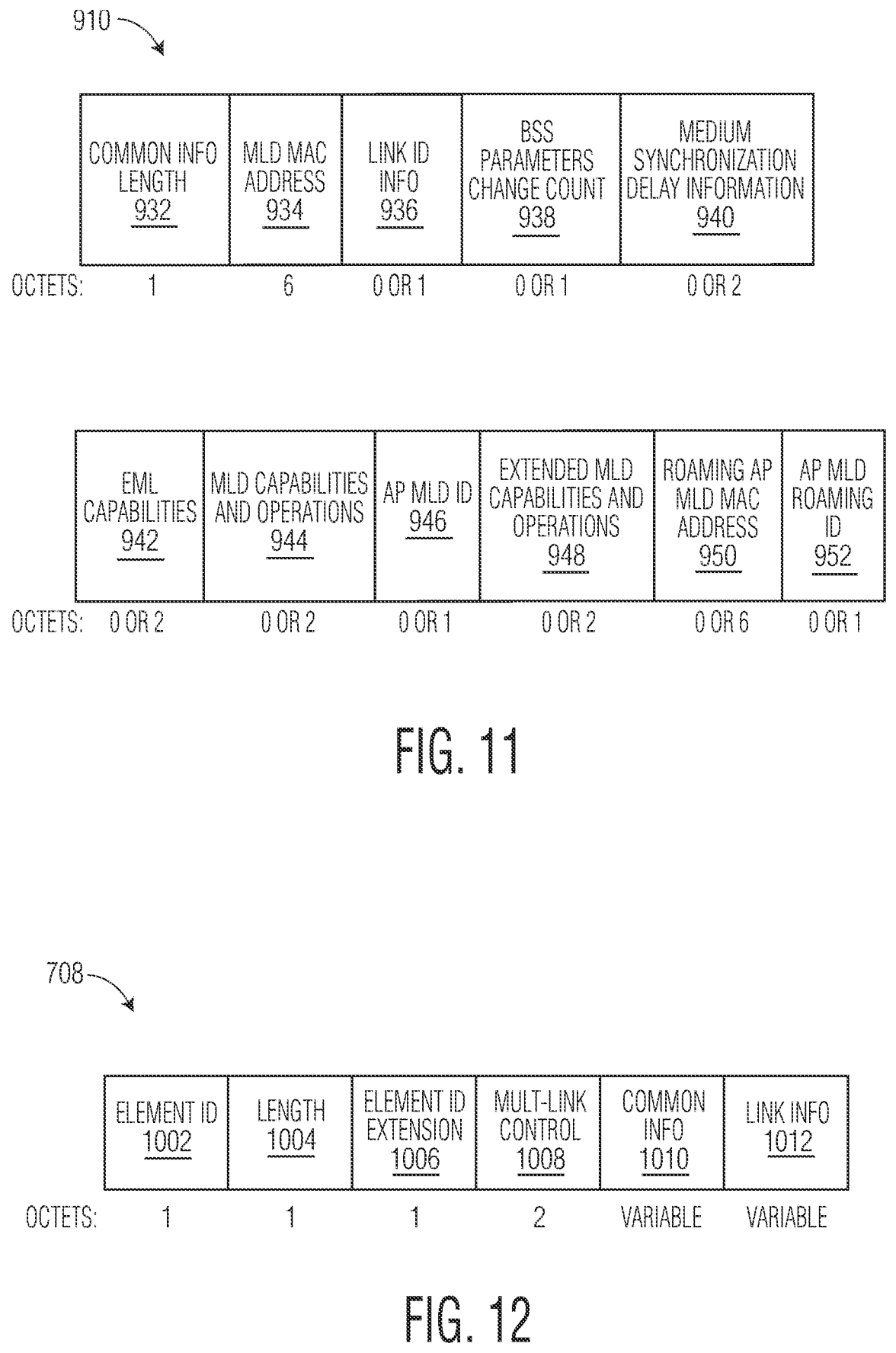

910

| COMMON INFO LENGTH 932 | MLD MAC ADDRESS 934 | LINK ID INFO 936 | BSS PARAMETERS CHANGE COUNT 938 | MEDIUM SYNCHRONIZATION DELAY INFORMATION 940 |
|---|---|---|---|---|
| 1 | 6 | 0 OR 1 | 0 OR 1 | 0 OR 2 |

OCTETS

| EML CAPABILITIES 942 | MLD CAPABILITIES AND OPERATIONS 944 | AP MLD ID 946 | EXTENDED MLD CAPABILITIES AND OPERATIONS 948 | ROAMING AP MLD MAC ADDRESS 950 | AP MLD ROAMING ID 952 |
|---|---|---|---|---|---|
| 0 OR 2 | 0 OR 2 | 0 OR 1 | 0 OR 2 | 0 OR 6 | 0 OR 1 |

OCTETS

| ELEMENT ID 1002 | LENGTH 1004 | ELEMENT ID EXTENSION 1006 | MULT-LINK CONTROL 1008 | COMMON INFO 1010 | LINK INFO 1012 |
|---|---|---|---|---|---|
| 1 | 1 | 1 | 2 | VARIABLE | VARIABLE |

OCTETS

FIG. 12

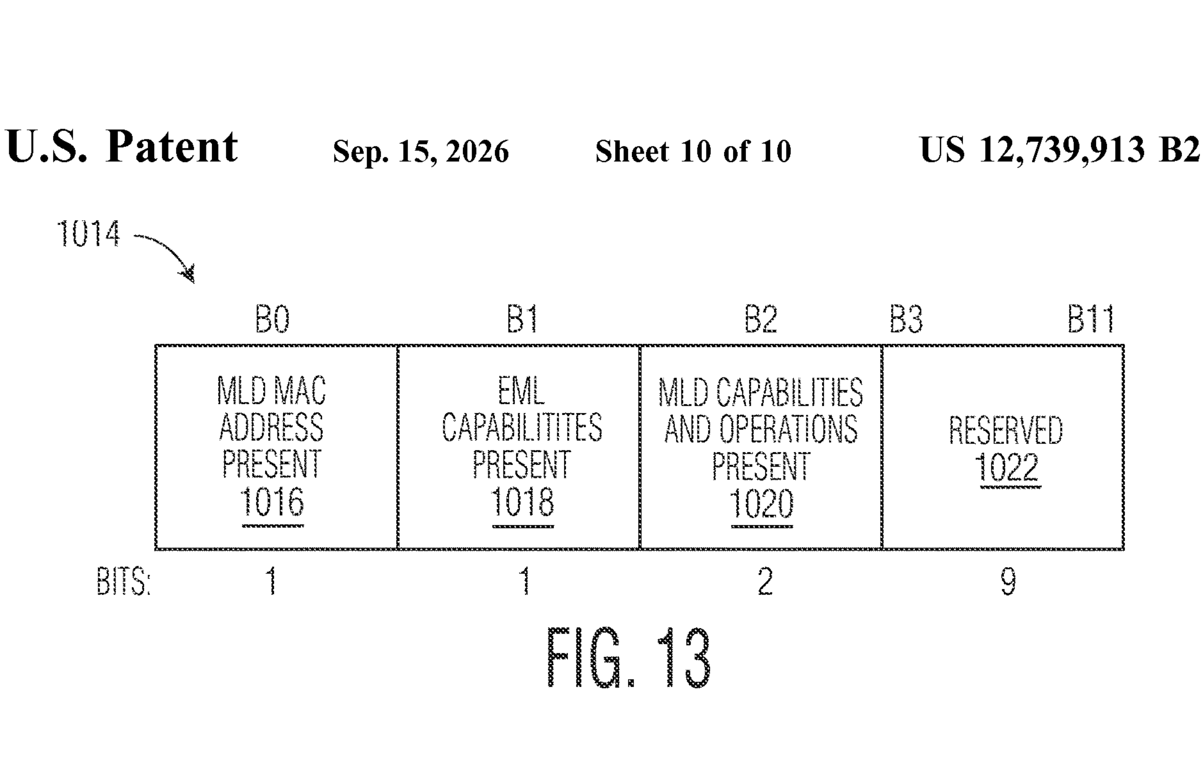
FIG. 13
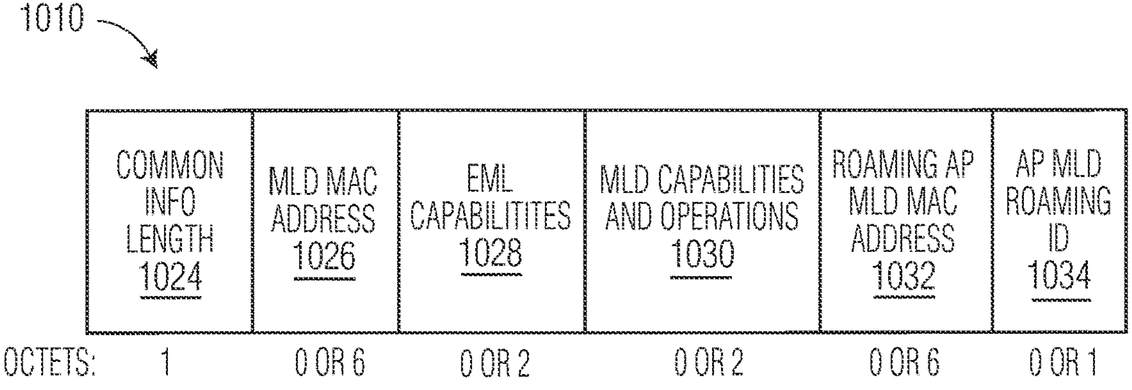
FIG. 14
1100
NEIGHBOR AP TBTT OFFSET 1102
BSSID (OPTIONAL) 1104
SHORT SSID (OPTIONAL) 1106
BSS PARAMETERS 1108
20 MHz PSD 1110
MLD PARAMETERS 1112
OCTETS:
1
0 OR 6
0 OR 4
0 OR 1
0 OR 1
0 OR 3
FIG. 15

HANDSHAKE FOR SMOOTH ROAMING

CROSS-REFERENCE TO RELATED APPLICATIONS

This application claims the benefit of U.S. Provisional Patent Application No. 63/381,798, filed Nov. 1, 2022, and U.S. Provisional Patent Application No. 63/516,815, filed Jul. 31, 2023, the contents of which are incorporated for all purposes by reference herein in its entirety.

FIELD OF THE DISCLOSURE

Various exemplary embodiments disclosed herein relate to a handshake for smooth roaming.

BACKGROUND

In ultra-high reliability (UHR), the use of a roaming access point (AP) multi-link device (MLD) with distributed AP MLDs at different locations may be used for smooth roaming. The distributed AP MLDs affiliated with the roaming AP MLD can cover a large area. As a result, the chance of transitioning from one roaming AP MLD to another AP MLD outside the roaming AP MLD or from one roaming AP MLD to another roaming AP MLD is decreased. When a non-AP MLD moves among the AP MLDs of the roaming AP MLD the transition occurs without the need for reassociation.

SUMMARY

A summary of various exemplary embodiments is presented below.

A method of roaming for a non-access point (non-AP) device with a roaming access point (AP) multi-link device (MLD), wherein the roaming AP MLD includes a plurality of AP MLDs in different devices at different locations having one medium access control (MAC) service access point (SAP), including: exchanging management frames between the non-AP device and a current serving AP MLD that is one of the plurality of AP MLDs to select a future serving AP MLD that is one of the plurality of AP MLDs and to select future serving link of the future serving AP MLD; and exchanging management frames between the non-AP device and the serving AP MLD to switch from the current serving AP MLD and the future serving AP MLD.

Various embodiments are described, wherein selecting the future serving AP MLD is initiated by the non-AP device.

Various embodiments are described, wherein selecting the future serving AP MLD is initiated by the current serving AP MLD.

Various embodiments are described, wherein the exchanged management frames are a link reconfiguration request frame transmitted by the non-AP device and a link reconfiguration response frame transmitted by the roaming AP MLD, and the link reconfiguration request frame and the link reconfiguration response frame are transmitted through the current serving AP MLD to the roaming AP MLD.

Various embodiments are described, wherein the exchanged management frames are a link reconfiguration request frame transmitted by the non-AP device and a link reconfiguration response frame transmitted by the roaming AP MLD, and the link reconfiguration request frame and the link reconfiguration response frame are transmitted through the future serving AP MLD to the roaming AP MLD.

Various embodiments are described, wherein the exchanged management frames are a link reconfiguration request frame transmitted by the non-AP device and a link reconfiguration response frame transmitted by the roaming AP MLD, the link reconfiguration request frame is transmitted through the current serving AP MLD to the roaming AP MLD, and the link reconfiguration response frame is transmitted through the current serving AP MLD to the roaming AP MLD.

Various embodiments are described, wherein the exchanged management frames are a link reconfiguration request frame transmitted by the non-AP device and a link reconfiguration response frame transmitted by the roaming AP MLD, the link reconfiguration request frame is transmitted through the current serving AP MLD to the roaming AP MLD, and the link reconfiguration response frame is transmitted through the future serving AP MLD to the roaming AP MLD.

Various embodiments are described, wherein the exchanged management frames are a link reconfiguration request frame transmitted by the non-AP device and a link reconfiguration response frame transmitted by the roaming AP MLD, and the link reconfiguration request frame and the link reconfiguration response frame are transmitted through the current serving AP MLD or the future AP MLD to the roaming AP MLD.

Various embodiments are described, wherein the exchanged management frames are a link reconfiguration request frame transmitted by the non-AP device and a link reconfiguration response frame transmitted by the roaming AP MLD, and a Common Info subfield of a Basic Multi-Link element in the link reconfiguration response frame includes a Roaming AP MLD medium access control (MAC) Address and a AP MLD Roaming ID.

Various embodiments are described, wherein a Presence Bitmap subfield of a Multi-Link Control field of the Basic Multi-Link element includes a Roaming AP MLD MAC Address Present indicator and an AP MLD Roaming ID Present indicator.

Various embodiments are described, wherein the exchanged management frames are a link reconfiguration request frame transmitted by the non-AP device and a link reconfiguration response frame transmitted by the roaming AP MLD, and a Common Info subfield of a Reconfiguration Multi-Link element in the link reconfiguration request frame includes a Roaming AP MLD medium access control (MAC) Address and a AP MLD Roaming ID.

Various embodiments are described, wherein a Presence Bitmap subfield of a Multi-Link Control field of the Reconfiguration Multi-Link element includes a Roaming AP MLD MAC Address Present indicator and an AP MLD Roaming ID Present indicator.

Various embodiments are described, wherein the exchanged management frames are basic service set (BSS) transitions management (BTM) Query, BTM Request, and BTM Response frames.

Various embodiments are described, wherein the BTM Query, BTM Request, and BTM Response frames carry neighbor AP MLD information and neighbor AP MLD affiliation information regarding the AP MLD's affiliation with the roaming AP MLD and a roaming MLD MAC address.

Various embodiments are described, wherein the exchanged management frames are a link reconfiguration request frame transmitted by the non-AP device and a link reconfiguration response frame transmitted by the roaming AP MLD, and the link reconfiguration request/response exchange is configured to carry out one of a TWT negotiation, traffic identifier (TID)-to-Link mapping negotiation, block acknowledge (BA) agreement negotiation, and emergency preparedness communications service (EPCS) information enablement with the future serving AP MLD.

Various embodiments are described, wherein the exchanged management frames are a link reconfiguration request frame transmitted by the non-AP device and a link reconfiguration response frame transmitted by the roaming AP MLD, and the link reconfiguration request/response exchange is configured to carry out a TWT negotiation, traffic identifier (TID)-to-Link mapping negotiation, block acknowledge (BA) agreement negotiation, and emergency preparedness communications service (EPCS) information enablement with the future serving AP MLD.

Various embodiments are described, wherein the exchanged management frames transfer a context of the current AP MLD to the future AP MLD, wherein the context includes one of pairwise transient key (PTK), current sequence number, reorder buffer information, transmit buffer information, emergency preparedness communications service (EPCS) information, traffic identifier (TID) information, and block acknowledge (BA) agreement information.

Further various embodiments relate to a roaming access point (AP) multi-link device (MLD), wherein the roaming AP MLD includes a plurality of AP MLDs in different devices at different locations having one medium access control (MAC) service access point (SAP), including a processor configured to: exchange management frames between the non-AP device and a current serving AP MLD that is one of the plurality of AP MLDs to select a future serving AP MLD that is one of the plurality of AP MLDs and to select future serving link of the future serving AP MLD; and exchange management frames between the non-AP device and the serving AP MLD to switch from the current serving AP MLD and the future serving AP MLD.

Various embodiments are described, wherein selecting the future serving AP MLD is initiated by the non-AP device.

Various embodiments are described, wherein selecting the future serving AP MLD is initiated by the current serving AP MLD.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 1 depicts a multi-link communications system 10 that is used for wireless communications.

FIG. 11 illustrates the Common Info subfield of the Basic Multi-Link element format according to an embodiment.

FIG. 12 illustrates the Reconfiguration Multi-Link element format according to an embodiment.

FIG. 13 illustrates the Prescence Bitmap subfield of the Reconfiguration Multi-Link element format according to an embodiment.

FIG. 14 illustrates the Prescence Bitmap subfield of the Reconfiguration Multi-Link element format according to an embodiment.

FIG. 15 illustrates a target beacon transmission time (TBTT) Information field format according to an embodiment.

DETAILED DESCRIPTION

Figure 2:
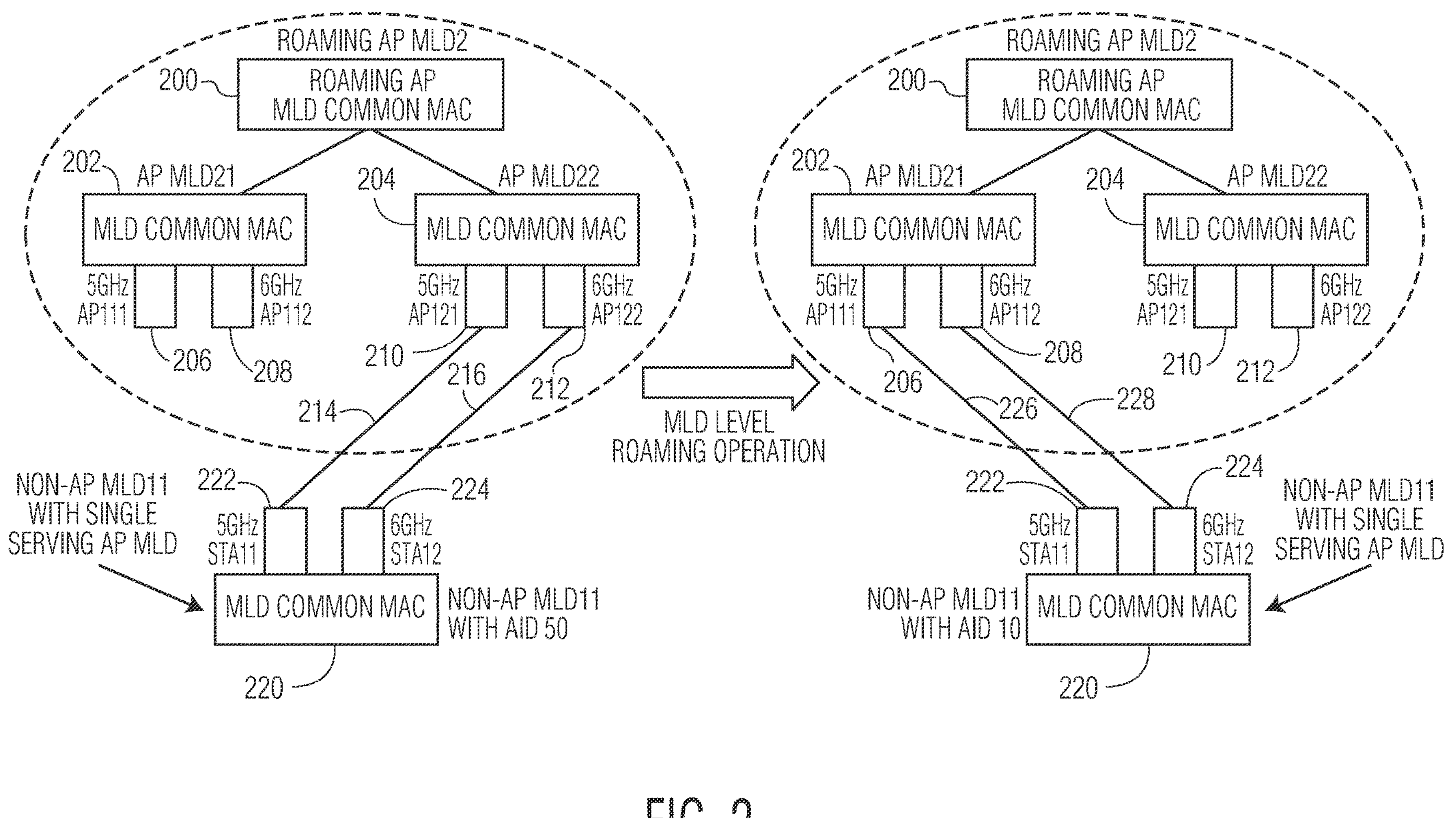
FIG. 2 illustrates a MLD level roaming operation according to an embodiment.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of WiFi systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

FIG. 1 depicts a multi-link communications system 10 that is used for wireless (e.g., WiFi) communications. In the embodiment depicted in FIG. 1, the multi-link communications system includes one AP multi-link device, which is implemented as AP MLD 1, and one non-AP STA multi-link device, which is implemented as STA MLD (non-AP MLD) 13. The multi-link communications system can be used in various applications, such as industrial applications, medical applications, computer applications, and/or consumer or enterprise applications. In some embodiments, the multi-link communications system may be a wireless communications system, such as a wireless communications system compatible with an IEEE 802.11 protocol. For example, the multi-link communications system may be a wireless communications system compatible with an IEEE 802.11bn protocol. Various iterations of the 802.11 specification are referred to herein. IEEE 802.11ac is referred to as very high throughput (VHT). IEEE 802.11ax is referred to as high efficiency (HE). IEEE 802.11be is referred to as extreme high throughput (EHT). IEEE 802.11bn is referred to as ultra-high reliability (UHR). The terms VHT, HE, EHT, and UHR will be used in the descriptions found herein.

Although the depicted multi-link communications system 10 is shown in FIG. 1 with certain components and described with certain functionality herein, other embodiments of the multi-link communications system may include fewer or more components to implement the same, less, or more functionality. For example, in some embodiments, the multi-link communications system includes a single AP MLD and multiple associated STA MLDs, or multiple AP MLDs and multiple STA MLDs with each STA MLD being associated with an AP MLD. In some embodiments, the legacy STAs (non-HE STAs) associate with one of the APs affiliated with the AP MLD. In some embodiment an AP MLD may have a single affiliated AP. In some embodiment a STA MLD may have a single affiliated STA. In another example, although the multi-link communications system is shown in FIG. 1 as being connected in a certain topology, the network topology of the multi-link communications system is not limited to the topology shown in FIG. 1.

In the embodiment depicted in FIG. 1, the AP MLD 1 includes a common MAC 6 and two APs 8-1, 8-2 in two links. In such an embodiment, the APs may be AP1 8-1 and AP2 8-2. In some embodiments, a common MAC 6 of the AP MLD 1 implements upper layer Media Access Control (MAC) functionalities (e.g., association establishment, reordering of frames, etc.) and a link specific part of the AP MLD 1, i.e., the APs 8-1 and 8-2, implement lower layer MAC functionalities (e.g., backoff, frame transmission, frame reception, etc.), PHY layer functionalities, radios. The APs 8-1 and 8-2 may be implemented in hardware (e.g., circuits), software, firmware, or a combination thereof. The APs 8-1 and 8-2 may be fully or partially implemented as an integrated circuit (IC) device. In some embodiments, the APs 8-1 and 8-2 may be wireless APs compatible with at least one WLAN communications protocol (e.g., at least one IEEE 802.11 protocol). For example, the APs 8-1 and 8-2 may be wireless APs compatible with the IEEE 802.11bn protocol.

In some embodiments, an AP MLD (e.g., AP MLD 1) connects to a local area network (e.g., a LAN) and/or to a backbone network (e.g., the Internet) through a wired connection and wirelessly connects to wireless STAs, for example, through one or more WLAN communications protocols, such as an IEEE 802.11 protocol. In some embodiment, an AP (e.g., AP1 8-1 and/or AP2 8-2) includes multiple RF chains. In some embodiments, an AP (e.g., AP1 8-1 and/or AP2 8-2) includes at least one antenna, at least one transceiver operably connected to the at least one antenna, and at least one controller operably connected to the corresponding transceiver. In some embodiments, at least one transceiver includes a physical layer (PHY) device. The at least one controller may be configured to control the at least one transceiver to process received packets through the at least one antenna. In some embodiments, the at least one controller may be implemented within a processor, such as a microcontroller, a host processor, a host, a digital signal processor (DSP), or a central processing unit (CPU), which can be integrated in a corresponding transceiver. In some embodiments, each of the APs 8-1 or 8-2 of the AP MLD 1 with multiple RF chains may operate in a different basic service set (BSS) operating channel (in a different link). For example, AP1 8-1 may operate in a 320 MHz BSS operating channel at 6 GHz band, and AP2 8-2 may operate in a 160 MHz BSS operating channel at 5 GHz band. Although the AP MLD 1 is shown in FIG. 1 as including two APs, other embodiments of the AP MLD 204 may include more than two APs, or one AP only.

In the embodiment depicted in FIG. 1, the non-AP STA multi-link device, implemented as STA MLD 13, includes a common MAC 16, two non-AP STAs 5-1 and 5-2 in two links. In such an embodiment, the non-AP STAs may be STA1 5-1 and STA2 5-2. The STAs 5-1 and 5-2 may be implemented in hardware (e.g., circuits), software, firmware, or a combination thereof. The STAs 5-1 and 5-2 may be fully or partially implemented as an IC device. In some embodiments, the non-AP STAs 5-1 and 5-2 are part of the STA MLD 13, such that the STA MLD may be a communications device that wirelessly connects to a wireless AP MLD. For example, the STA MLD 13 may be implemented in a laptop, a desktop personal computer (PC), a mobile phone, or other communications device that supports at least one WLAN communications protocol. In some embodiments, the non-AP STA MLD 13 is a communications device compatible with at least one IEEE 802.11 protocol (e.g., an IEEE 802.11bn protocol, an IEEE 802.11be protocol, an IEEE 802.11ax protocol, or an IEEE 802.11ac protocol). In some embodiments, the STA MLD 13 implements a common MAC functionality 16 and the non-AP STAs 5-1 and 5-2 implement a lower layer MAC data functionality, PHY functionalities.

In some embodiments, the AP MLD 1 and/or the STA MLD 13 may identify which communication links support multi-link operation during a multi-link operation setup phase and/or exchanges information regarding multi-link capabilities during the multi-link operation setup phase. In some embodiments, each of the non-AP STAs 5-1 and 5-2 of the STA MLD 13 in different link may operate in a different frequency band. For example, the non-AP STA1 5-1 in one link may operate in the 2.4 GHz frequency band and the non-AP STA2 5-2 in another link may operate in the 5 GHz frequency band. In some embodiments, each STA includes at least one antenna, at least one transceiver operably connected to the at least one antenna, and at least one controller connected to the corresponding transceiver. In some embodiments, at least one transceiver includes a PHY device. The at least one controller may be configured to control the at least one transceiver to process received packets through the at least one antenna. In some embodiments, the at least one controller may be implemented within a processor, such as a microcontroller, a host processor, a host, a DSP, or a CPU, which can be integrated in a corresponding transceiver.

In the embodiment depicted in FIG. 1, the STA MLD 13 communicates with the AP MLD 1 via two communication links, e.g., link 1 3-1 and link 2 3-2. For example, each of the non-AP STAs 3-1 or 3-2 communicates with an AP 8-1 or 8-2 via corresponding communication links 3-1 or 3-2. In an embodiment, a communication link (e.g., link 1 3-1 or link 2 3-2) may include a BSS operating channel established by an AP (e.g., AP1 8-1 or AP2 8-2) that features multiple 20 MHz channels used to transmit frames (e.g., Beacon frames, management frames, etc.) being carried in Physical Layer Convergence Protocol (PLCP) Protocol Data Units (PPDUs) between a first wireless device (e.g., an AP, an AP MLD, an STA, or an STA MLD) and a second wireless device (e.g., an AP, an AP MLD, an STA, or an STA MLD). In some embodiments, a 20 MHz channel may be a punctured 20 MHz channel or an unpunctured 20 MHz channel. Although the STA MLD 13 is shown in FIG. 1 as including two non-AP STAs, other embodiments of the STA MLD 13 may include one non-AP STA or more than two non-AP STAs. In addition, although the AP MLD 1 communicates (e.g., wirelessly communicates) with the STA MLD 13 via multiple links 3-1 and 3-2, in other embodiments, the AP MLD 1 may communicate (e.g., wirelessly communicate) with the STA MLD 13 via more than two communication links or less than two communication links.

As described above a multi-link AP MLD has one or multiple links where each link has one AP affiliated with the AP MLD. This may be accomplished by having the different radios for the different affiliated APs.

A multi-link STA MLD has one or multiple links where each link has one STA affiliated with the STA MLD. One way to implement the multi-link STA MLD is using two or more radios, where each radio is associated with a specific link. For example, an multi-link multi-radio (MLMR) non-AP MLD may be used. The MLMR non-AP MLD uses multiple full functional radios to monitor the medium in multiple links. Another way to implement the multi-link STA MLD is using a single radio in two different bands. Each band may be associated with a specific link. In this case only one link is available at a time. In yet another implementation, an enhanced single-radio (ESR) STA MLD may be used that operates in an enhanced multi-link single radio (cMLSR) mode. The ESR STA MLD uses two radios in different bands to implement the MLD. For example, one radio may be a lower cost radio with lesser capabilities and the other radio may be a fully functional radio supporting the latest protocols. The ESR STA MLD may dynamically switch its working link while it can only transmit or receive through one link at any time. The ESR STA MLD may monitor two links simultaneously, for example, detecting medium idle/busy status of each link, or receiving a PPDU on each link. Each radio may have its own backoff time, and when the backoff counter for one of the radios becomes zero that radio and link may be used for transmission. For example, if an AP wants to use the fully functional radio, it may send a control frame that is long enough for the ESR STA MLD to switch from the lesser capable radio to the fully functional radio that may then transmit data to the AP. When an ESS includes multiple AP MLDs in different locations and a STA MLD executed the data frame exchanges with one of the AP MLDs (say AP MLD1), as the STA MLD's associated AP MLD moves to other location to do the data frame exchanges with another one of the AP MLDs (say AP MLD2), the STA MLD (same as a non-AP MLD herein) needs to finish the association with AP MLD2 before doing the data frame exchanges with AP MLD2. There is a requirement to decrease the number of associations within the ESS.

FIG. 2 illustrates a MLD level roaming operation according to an embodiment. A roaming AP MLD2 200 includes a number of different AP MLDs in different physical locations that operate together and have a common MAC service access point (SAP) address. The roaming AP MLD2 200 may include AP MLD21 202 and AP MLD22 204. The AP MLD21 202 includes 5 GHz AP111 206 and 6 Ghz AP112 208. The AP MLD22 204 includes 5 GHz AP121 210 and 6 Ghz AP122 212. In FIG. 2 there is a non-AP MLD11 220 that includes 5 GHz STA11 222 and 6 GHz STA12 224. There are two links between AP MLD22 204 and AP MLD21 202: link 1 214 and link 2 216. Link 1 214 is between 5 GHz AP121 210 and 5 GHz STA11 222, and link 2 216 is between 6 Ghz AP122 212 and 6 GHz STA12 224. The non-AP MLD 11 220 establishes the multi-link association with the roaming AP MLD2 200 with AP MLD 22 204 as the serving AP MLD. The non-AP MLD executes the data frame exchanges (or strictly executes the frame exchanges by using class 3 frames) with the serving AP MLD 22 204 in the roaming AP MLD2 200.

The non-AP MLD11 220 may be mobile and move relative to roaming AP MLD2 200. Therefore the non-AP MLD11 220 may roam from one AP MLD (i.e., the current serving AP MLD) of roaming AP MLD2 200 to another AP MLD (i.e., future serving AP MLD) of the roaming AP MLD2 200 without the need for reassociation. The right side of FIG. 2 illustrates non-AP MLD11 220 roaming from AP MLD22 204 to AP MLD21 202. In this case new links link 3 226 and link 4 228 are established between AP MLD21 202 and non-AP MLD11 220, and the frame exchange context of non-AP MLD11 220 is transferred to AP MLD 21 202 from AP MLD 22 204 for the frame exchanges with non-AP MLD11 220. Link 3 226 is between 5 GHz AP111 206 and 5 GHz STA11 222, and link 4 228 is between 6 Ghz AP112 208 and 6 GHz STA12.

In one embodiment, smooth roaming of a non-AP MLD from one serving AP MLD affiliated with a roaming AP MLD to another AP MLD affiliated with the same roaming AP MLD as the new serving AP MLD may be carried out in two steps. In a first step, information regarding the candidate serving AP MLD for the non-AP MLD is exchanged so that a new or future serving AP MLD affiliated with the same roaming AP MLD may be selected as the current serving AP MLD. In a second step the non-AP MLD roams from the current serving AP MLD to the new or future serving AP MLD and includes the frame exchanges to transfer the frame exchange context of the non-AP MLD to the new serving AP MLD in the roaming AP MLD. The context may include the following: pairwise transient key (PTK), PN, replay counter, current sequence number, WinStart and WinEnd of reorder buffer, WinStart and WinEnd of transmit buffer, emergency preparedness communications service (EPCS) information, traffic identifier (TID) information, block acknowledge (BA) agreement information, etc. The communication between the serving AP MLD on behalf of roaming AP MLD and the non-AP MLD is encrypted using the PTK and PN. Accordingly, the new serving AP MLD needs to know this PTK, PN and replay counters in order to encrypt, decrypt and replay check of the protected unicast frames exchanged with the non-AP MLD. Frame transmitted between the AP MLD and the non-AP MLD use a sequence number for each Date/Management frame and have associated smallest sequence number (WinStart) and largest sequence number (WinEnd) related to transmit and reorder buffers based upon traffic identifiers (TIDs). This information needs to be moved to the new serving AP MLD that will serve the non-AP MLD. Additionally, any information needed to support the communication between the new or future AP MLD and the non-AP MLD will be transferred.

In one embodiment, the information acquiring of the candidate serving AP MLDs is done through BTM Query, BTM Request, BTM Response frames. In one embodiment, the information acquiring of the candidate serving AP MLDs is done through the newly defined Action frames or the other Action frames. In one embodiment, the information acquiring of the candidate serving AP MLDs through BTM procedure is optional. In one embodiment, a non-AP MLD transmit the Multi-Link Probe Request to the roaming AP MLD through its current serving AP MLD (or the candidate serving AP MLD) to solicit the full information of the candidate serving AP MLD and the requested affiliated AP candidate serving AP MLD. In one embodiment, after receiving the request from a non-AP MLD, its current serving AP MLD (if the request is received by the current serving AP MLD) or the candidate serving AP MLD (if the request is received by the candidate serving AP MLD) responds with the Multi-Link Probe Response to the non-AP AP MLD about the full information of the candidate serving AP MLD and the requested affiliated APs. In one embodiment, the updated MLD reconfiguration procedure is used for the roaming to the selected new serving AP MLD and forwarding the frame exchange context. In one embodiment, the new defined Action frames are used for the roaming to the selected new serving AP MLD and forwarding the frame exchange context.

Smooth roaming or BSS transitions management (BTM) between AP MLDs in a roaming AP MLD2 200 will now be described. When the non-AP MLD11 220 would like to request or provide the MLD transition candidate AP MLDs, e.g. when the RSSI of current serving AP MLD 22 204 becomes worse, it may transmit a BTM Query frame to the roaming AP MLD 2 200 through the serving AP MLD 22 204. After receiving the BTM Query frame, the serving AP MLD 22 204 on behalf of the roaming AP MLD2 200 will transmit BTM Request frame to the non-AP MLD11 220 to provide the candidate AP MLDs, in this example the new serving AP MLD21 202. Another alternative method is that without receiving the BTM Request, the current serving AP MLD22 204 on behalf of the roaming AP MLD2 200 transmits BTM Request to the non-AP MLD11 220 to provide the candidate AP MLDs, in this example the new serving AP MLD21 202. After receiving BTM Request, the STA MLD11 220 optionally transmits BTM Response frame with status. On one embodiment, the BTM Request doesn't indicate the immediate transition since the real transition is done through the other management frame exchange, e.g. through the updated MLD reconfiguration related Action frames. In one embodiment, the transmission of BTM Response frame is optional.

Figure 3:
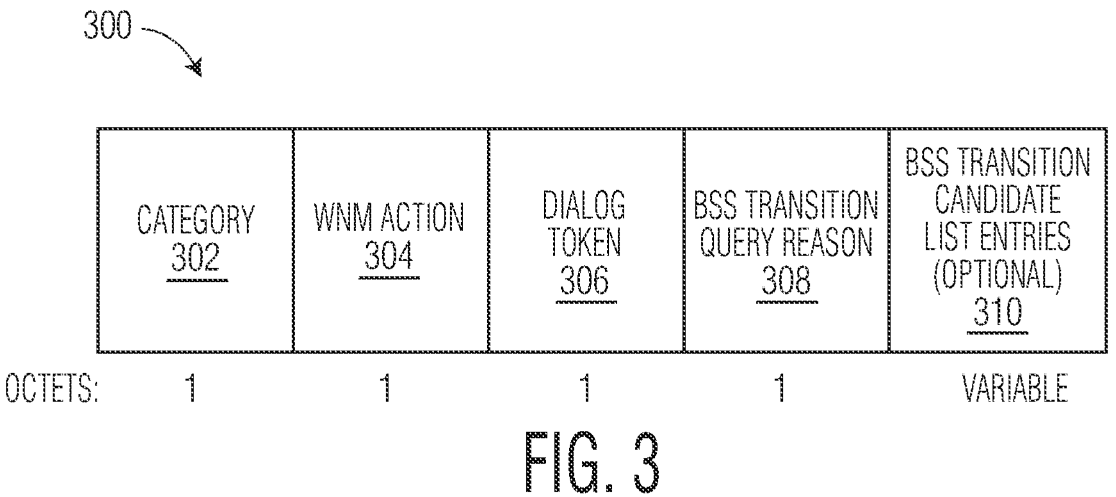
FIG. 3 illustrates a BTM Query frame Action field format according to an embodiment.

FIG. 3 illustrates a BTM Query frame Action field format according to an embodiment. The BTM Query frame Action field format 300 includes the following fields: Category 302; wireless network monitor (WNN) Action 304; Dialog Token 306; BSS Transition Query Reason 308; and BSS Transition Candidate List Entities 310 (optional). The BTM Query frame Action field format 300 is used by an AP MLD of the roaming AP MLD2 200 to determine what other AP MLDs in the roaming AP MLD2 200 are candidates for roaming. The BSS Transition Candidate List Entities 310 includes a list of these roaming candidates.

Figure 4:
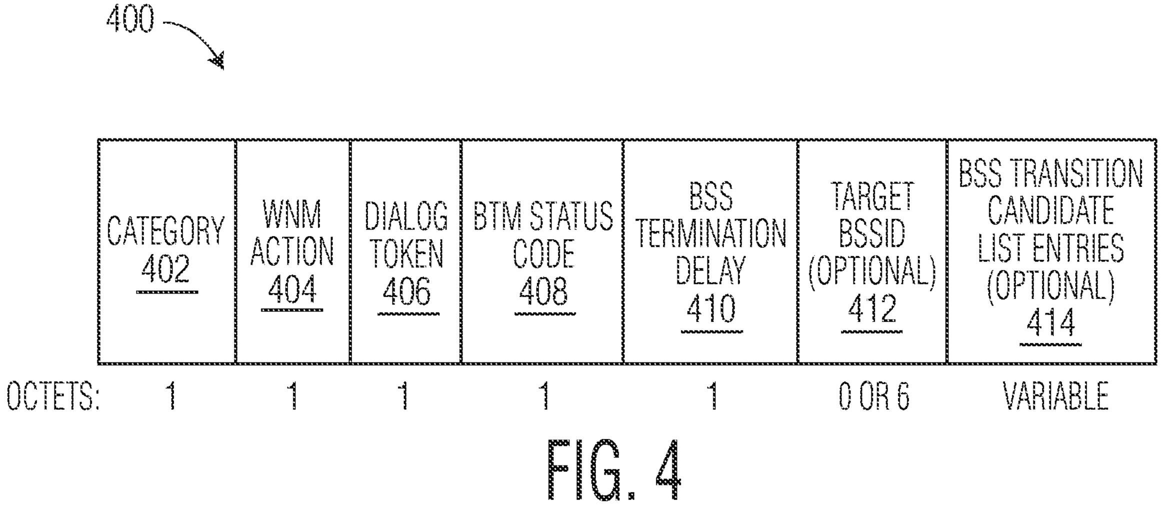
FIG. 4 illustrates a BTM Response frame Action field format according to an embodiment.

FIG. 4 illustrates a BTM Response frame Action field format 400 according to an embodiment. The BTM Response frame Action field format 400 includes the following fields: Category 402; WMN Action 404; Dialog Token 406; BTM Status Code 408; BSS Termination Delay 410; Target BSSID 412 (optional); and BSS Transition Candidate List Entities 414 (optional). The BTM Response frame Action field format 400 is sent by the AP MLD in the roaming AP MLD2 200 in response to BTM Request Frame Action message from its associated non-AP MLD. The AP MLD may include BSS Transition Candidate List Entities 414 in the BTM Response frame Action field format 400 that lists potential AP MLDs in the roaming AP MLD2 200 that are candidates for roaming.

Figure 5A:
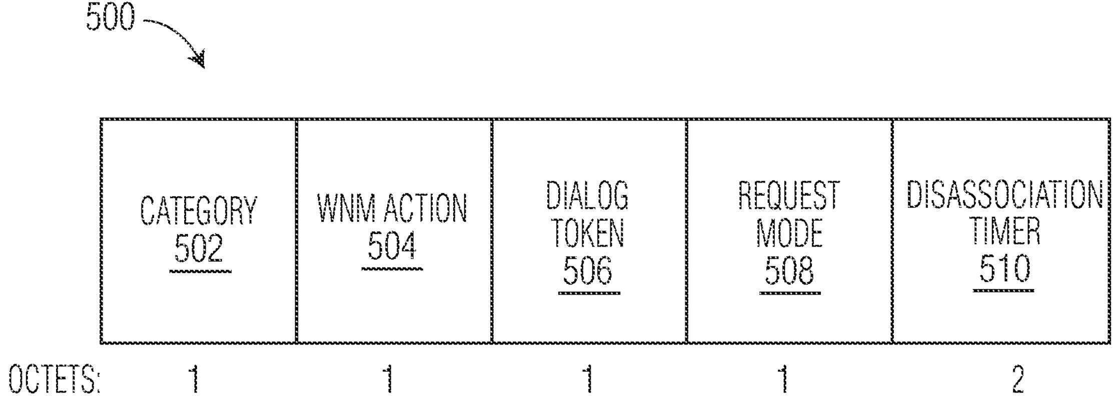
FIG. 5A illustrates a BTM Request Frame Action field format according to an embodiment.

FIG. 5A illustrates a BTM Request Frame Action field format 500 according to an embodiment. The BTM Request Frame Action field format 500 includes the following fields: Category 502; WMN Action 504; Dialog Token 506; Request Mode 508; Disassociation Timer 510; Validity Interval 512; BSS Termination Duration 514; Session information URL 516; and BSS Transition Candidate List Entities 518. A non-AP MLD sends the BTM Request Frame Action field format 500 to its associated AP MLD in the roaming AP MLD2 200 in order to initiate a BSS transition.

Figure 5B:
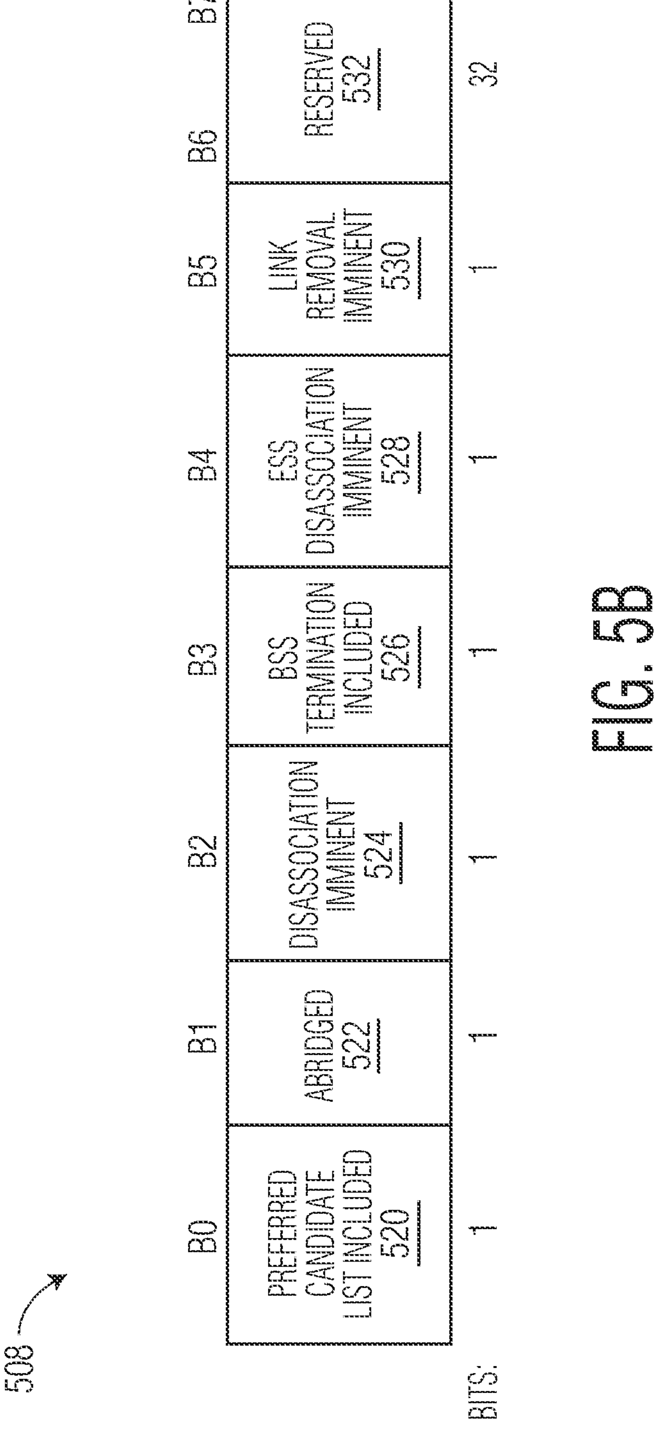
FIG. 5B illustrates a Request Mode field format according to an embodiment.

FIG. 5B illustrates a Request Mode field format according to an embodiment. The Request Mode 508 includes the following fields: Preferred Candidate List Included 520; Abridged 522; Disassociation Imminent 524; BSS Termination Included 526; ESS Disassociation Imminent 528; Link Removal Imminent 530; and Reserved 532.

Figure 6:
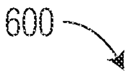
FIG. 6 illustrates the optional subelement IDs for a Neighbor Report according to an embodiment.

FIG. 6 illustrates the optional subelement IDs for a Neighbor Report. The Optional subelement IDs for Neighbor Report 600 table includes a Subelement ID column, a Name column, and an Extensible column. The subelement IDs 199-201 are for EHT Capabilities, EHT Operation, and Basic Muli-Link, respectively, and each of these are extensible. Subelement IDs 202-220 are reserved.

It is noted that the various formats and fields described in FIGS. 3-6 are described in further detail in the IEEE 802.11be specification.

In some embodiment, a non-AP MLD may transmit Multi-Link Probe Request frame to its serving AP MLD to request the detailed information of the candidate serving AP MLD and the detailed information of the APs affiliated with the candidate serving AP MLD. The updated Reconfiguration Multi-Link element in Multi-Link Probe Request frame can be used to indicate the candidate serving AP MLD and its affiliated roaming AP MLD. Another variant is to define a new request element. After processing the received ML Probe Request, the serving AP MLD will respond the Multi-Link Probe Response frame to its serving AP MLD to respond with the detail information of the candidate serving AP MLD and the detail information of the APs affiliated with the candidate serving AP MLD. The updated Basic Multi-Link element or the new defined element in ML Probe Response frame can be used for carrying the detailed information of the candidate serving AP MLD and the detailed information of the APs affiliated with the candidate serving AP MLD. In some embodiments, a non-AP MLD switch to the operating channel of at least one AP affiliated with the candidate serving AP MLD to acquire the detailed information of the candidate serving AP MLD and the detailed information of the APs affiliated with the candidate serving AP MLD through the ML Probe/Response, or normal Probe Request/Response.

In one embodiment, a non-AP MLD can do the AP MLD roaming through requesting to add a link or delete a link with its associated roaming AP MLD where the added links are in the now serving AP MLD and the deleted links are in the current serving AP MLD. In one embodiment, Link Reconfiguration Request/Response frames are used for link addition/deletion at the roaming AP MLD side. The Reconfiguration Multi-Link element in Link Reconfiguration Request carries the full information of the STA in the added link. In one embodiment, the new defined Action frames are used for link addition/deletion at the roaming AP MLD side.

Figure 7:
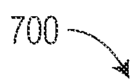
FIG. 7 illustrates the Link Reconfiguration Request frame Action field format according to an embodiment.
Figure 8:
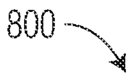
FIG. 8 illustrates the Link Reconfiguration Response frame according to an embodiment.

FIG. 7 illustrates the Link Reconfiguration Request frame Action field format 700 according to an embodiment. The Link Reconfiguration Request frame Action field format 700 includes the following fields: Category 702; Protected EHT Action 704; Dialog Token 706; Reconfiguration Multi-Link element 708; and OCI element 710. FIG. 8 illustrates the Link Reconfiguration Response frame according to an embodiment. Action field format 800. The Link Reconfiguration Response frame Action field format 800 includes the following fields: Category 802; Protected EHT Action 804; Dialog Token 806; Count 808; Reconfiguration Status List 810; Group Key Data 812; OCI element 814; and Basic Multi-Link element 816. Note that both Link Reconfiguration Request frame Action field format 700 and Link Reconfiguration Response frame Action field format 800 are defined in the IEEE 802.11be specification.

The information exchange for candidate serving AP MLDs will now be described. BTM Query, Request, and Response frames are used for the information exchange of the candidate serving AP MLD affiliated with the same serving AP MLD as the current serving AP MLD. The neighbor report element may carry the basic multi-link subelement for indicating a neighbor(s) AP MLD affiliated with the roaming AP MLD. The roaming AP MLD may be indicated in the common info field of the basic multi-link element. Another variant is that a newly defined type of multi-link element is defined to indicate the affiliated roaming AP MLD. Also newly defined action frames may be used for the information exchange of the candidate serving AP MLD affiliated with the same serving AP MLD as the current serving AP MLD.

The negotiation of roaming from one serving AP MLD to another serving AP MLD will now be described. A non-AP MLD may request to add a link or delete a link with its associated roaming AP MLD where the added link(s) is (are) in a different AP MLD (the new serving AP MLD) affiliated with its associated roaming AP MLD and the deleted links are related to the current serving AP MLD affiliated with its associated roaming AP MLD. The link reconfiguration request/response or the newly defined action frames are used for link addition/deletion at roaming AP MLD side. The link reconfiguration request is transmitted by the non-AP MLD and the link reconfiguration response is transmitted by the roaming AP MLD. There are four options for how to carry out the exchange of the link reconfiguration request/response frames. In a first option, the link reconfiguration request/response frames are transmitted through the current serving AP MLD to the roaming AP MLD. In a second option, the link reconfiguration request/response frames are transmitted through the future serving AP MLD to the roaming AP MLD. In a third option, the link reconfiguration request frame is transmitted through the current serving AP MLD to the roaming AP MLD, and the link reconfiguration response frame is transmitted through the current or the future serving AP MLD to the roaming AP MLD. In a fourth option, the link reconfiguration request/response frames are transmitted through the current or the future serving AP MLD to the roaming AP MLD.

If the AP affiliated with current serving AP MLD is used as the receiver/transmitter of the link reconfiguration request/response, all the STAs of the non-AP MLD are placed in power save mode with the future serving AP MLD after the serving AP MLD switch. The reconfiguration multi-link element in link reconfiguration request indicates the new serving AP MLD and the links being set up. After the reception of the link reconfiguration response where the serving AP MLD switch is accepted, the future serving AP MLD's frame exchange context with the non-AP MLD is ready. The frame exchange context in the current serving AP MLD is cancelled (i.e., it is not to be used for frame exchanges any more).

Another variant is that the link reconfiguration request/response negotiates the time when the future serving AP MLD's frame exchange context with the non-AP MLD is ready.

The link reconfiguration request/response can carry out the TWT negotiation, TID-to-Link mapping negotiation, BA agreement negotiation, EPCS enablement etc. with the future serving AP MLD.

Figure 9:
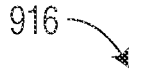
FIG. 9 illustrates Basic Multi-Link element format according to an embodiment.
Figure 10:
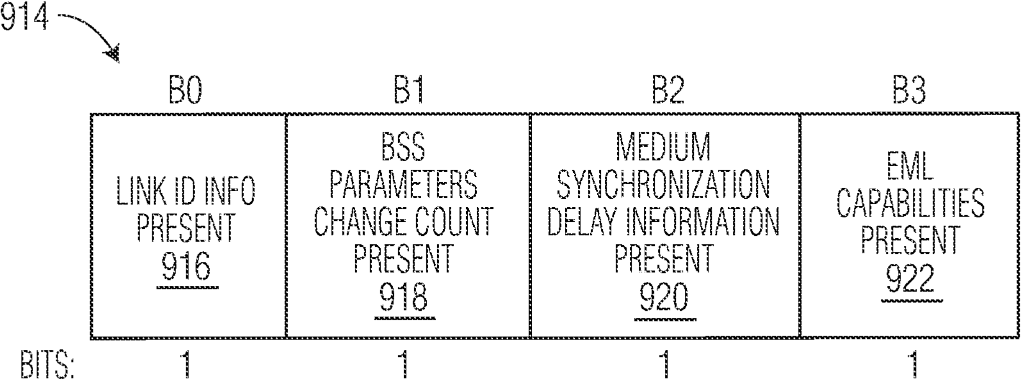
FIG. 10 illustrates Presence Bitmap subfield of the Basic Multi-Link element format according to an embodiment.

The Link Reconfiguration Response frame Action field format 800 has a basic Multi-Link element 816 that includes information regarding roaming, and the basic Multi-Link element may be updated to include the roaming AP MLD information that the new serving AP MLD is affiliated with. FIG. 9 illustrates Basic Multi-Link element format according to an embodiment. The Basic Multi-Link element 816 includes the following fields: Element ID 902; Length 904; Element ID Extension 906; Multi-Link Control 908; Common Info 910; and Link Info 912. FIG. 10 illustrates Presence Bitmap subfield of the Basic Multi-Link element format according to an embodiment. The Multi-Link Control 908 includes a Presence Bitmap subfield of the Basic Multi-Link element format 914. The Presence Bitmap subfield of the Basic Multi-Link element format 914 includes the following fields: Link ID Info Present 916; BSS Parameters Change Count Present 918; Medium Synchronization Delay Information Present 920; EML Capabilities Present 922; MLD Capabilities And Operation Present 924; AP MLD ID Present 926; Extended MLD Capabilities And Operations Present 928; and Reserved 930. The Reserved fields 930 may be modified so that one bit is used as a Roaming AP MLD MAC Address Present indicator, and another bit is used as a AP MLD Roaming ID Present indicator. In some embodiment, such updated Basic Multi-Link element carried in an AP's Beacon can also be used by the AP to announce that the AP MLD that the AP is affiliated with is affiliated with an roaming AP MLD.

FIG. 11 illustrates the Common Info subfield of the Basic Multi-Link element format according to an embodiment. The Common Info 910 includes the following fields: Common Info Length 932; MDL MAC Address 934; Link ID Info 936; BSS Parameters Change Count 938; Medium Synchronization Delay Information 940; EML Capabilities 942; MLD Capabilities And Operation 944; AP MLD ID 946; Extended MLD Capabilities And Operations 948; Roaming AP MLD MAC Address 950; and AP MLD Roaming ID 952. The Roaming AP MLD MAC Address 950 and AP MLD Roaming ID 952 fields are newly added and correspond to the two newly defined bits in the Reserved field 930 of Presence Bitmap subfield of the Basic Multi-Link element format 914.

The Roaming AP MLD MAC Address Present subfield and AP MLD Roaming ID Present subfield are added to Presence Bitmap subfield of the Basic Multi-Link element format 914 by using any two bits of B7 to B11 of the Reserved field 930, e.g., B7 and B8. If the Roaming AP MLD MAC Address Present subfield is 1, the Roaming AP MLD MAC Address 950 is carried in Common Info 910 field to indicate the MAC SAP address of roaming AP MLD that the AP MLD indicated by the MLD Address of the Basic Multi-Link element is affiliated with. If the AP MLD Roaming ID Present subfield is 1, the AP MLD Roaming ID 952 field indicates the AP MLD identifier of the AP MLD identified by MLD MAC Address within the Roaming AP MLD. Each AP MLD affiliated with a roaming AP MLD has a unique AP MLD Roaming identifier within the roaming AP MLD. Roaming AP MLD level specific features that are not defined by its affiliated AP MLDs may also be in Common Info subfield, e.g., whether link level roaming is supported.

A variant could be that the Roaming AP MLD Info Present subfield is added in Presence Bitmap subfield and if Roaming AP MLD Info Present is equal to 1, the Common Info in the same Basic Multi-Link element carries the Roaming AP MLD MAC Address and AP MLD Roaming ID. It is noted that a non-UHR non-AP MLD cannot decode the newly added (sub)fields.

The link Reconfiguration Request frame Action field format 700 has a Reconfiguration Multi-Link element 708 that includes information regarding roaming AP MLD, and the Reconfiguration Multi-Link element 708 may be updated to include such roaming AP MLD information. FIG. 12 illustrates the Reconfiguration Multi-Link element format according to an embodiment. The Reconfiguration Multi-Link element 708 includes the following fields: Element ID 1002; Length 1004; Element ID Extension 1006; Multi-Link Control 1008; Common Info 1010; and Link Info 1012. FIG. 13 illustrates the Prescence Bitmap subfield of the Reconfiguration Multi-Link element format according to an embodiment. The Prescence Bitmap subfield of the Reconfiguration Multi-Link element format 1014 includes the following fields: MLD MAC Address Present 1016; EML Capabilities Present 1018; MLD Capabilities And Operations Present 1020; and Reserved 1022. The Reserved fields may be 1022 modified so that one bit is used as the Roaming AP MLD MAC Address Present, and another bit is used to indicate AP MLD Roaming ID Present.

FIG. 14 illustrates Common Info subfield of the Reconfigured Multi-Lin element format according to an embodiment. The Common Info 1010 includes the following fields: Common Info Length 1024; MLD MAC Address 1026; EML Capabilities 1028; MLD Capabilities And Operations 1030; Roaming AP MLD MAC Address 1032; and AP MLD Roaming ID 1034. The Roaming AP MLD MAC Address 1032 and AP MLD Roaming ID 1034 fields are newly added and correspond to the two newly defined bits in the Reserved field 1022 of the Prescence Bitmap subfield of the Reconfiguration Multi-Link element format 1014.

The Roaming AP MLD MAC Address Present subfield and AP MLD Roaming ID Present subfield are added to the Prescence Bitmap subfield of the Reconfiguration Multi-Link element format 1014 subfield by using any two bits of B3 to B11 of the Reserved 1022, e.g., B3 and B4. If the AP MLD MAC Address Present subfield is 1, the Roaming AP MLD MAC Address 1032 is carried in the Common Info 1010 field to indicate the MAC SAP address of roaming AP MLD that the AP MLD indicated by the MLD Address of the Reconfiguration Multi-Link element is affiliated with. If the AP MLD Roaming ID Present subfield is 1, the AP MLD Roaming ID 1034 field indicates the AP MLD identifier of the AP MLD identified by MLD MAC Address within the Roaming AP MLD. Each AP MLD affiliated with a roaming AP MLD has a unique AP MLD Roaming identifier within the roaming AP MLD.

A variant could be that the Roaming AP MLD Info Present subfield is added in Presence Bitmap subfield and if Roaming AP MLD Info Present is equal to 1, the Common Info 1010 in the same Basic Multi-Link element carries the Roaming AP MLD MAC Address 1032 and AP MLD Roaming ID 1034. It is noted that a non-UHR non-AP MLD cannot decode the newly added (sub)fields.

In another embodiment, a new Multi-Link Element may be defined. The new type of Multi-Link element is used to announce the roaming AP MLD and include the Roaming AP MLD MAC Address and the AP MLD Roaming ID of the Affiliated AP MLD. It may also include Roaming AP MLD level specific features that are not defined by its affiliated AP MLDs, e.g., whether link level roaming is supported. The new Multi-link Element may replace the Reconfiguration Multi-Link element 708 in and Link Reconfiguration Request frame Action field format 700 and may replace the Basic Multi-Link element 816 in the Link Reconfiguration Response frame Action field format 800.

When a beacon frame is transmitted reduced neighbor reportion (RNR) information may be included in an RNR element. A new type of RNR element is now described that will carry information related to the roaming AP MLD and potential AP MLDs in the roaming AP MLD that may be used for roaming. FIG. 15 illustrates a target beacon transmission time (TBTT) Information field format according to an embodiment. The TBTT Information field format 1100 includes the following fields: Neighbor AP TBTT Offset 1102; BSSID 1104 (optional); Short SSID 1106 (optional); BSS parameters 1108; 20 MHz PSD 1110; and MLD Parameters 1112. A first AP uses a TBTT Information Field Type that is not 0 in the newly defined TBTT Information field format 1100 to announce a second AP where the following are true: the first AP and the second AP are not affiliated with the same AP MLD; the AP MLD with which the first AP is affiliated and the AP MLD with which the second AP MLD is affiliated are affiliated with the same roaming AP MLD; and the second AP MLD and the first AP MLD are one-hop neighbors (or two-hop neighbors as another example) if the two AP's links supporting the same band work in the same channels.

Another variant is that the first AP intends to carry the second AP's information.

The MLD Parameters 1112 is used to carry the MLD related information of the affiliated AP MLD and affiliated roaming AP MLD. It is noted that the reason for using a TBTT Information field is because it will not be visible to non-UHR non-AP MLDs.

The foregoing disclosure provides illustration and description but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like. It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, the term "non-transitory machine-readable storage medium" will be understood to exclude a transitory propagation signal but to include all forms of volatile and non-volatile memory. When software is implemented on a processor, the combination of software and processor becomes a specific dedicated machine.

Because the data processing implementing the embodiments described herein is, for the most part, composed of electronic components and circuits known to those skilled in the art, circuit details will not be explained in any greater extent than that considered necessary as illustrated above, for the understanding and appreciation of the underlying concepts of the aspects described herein and in order not to obfuscate or distract from the teachings of the aspects described herein.

Unless stated otherwise, terms such as "first" and "second" are used to arbitrarily distinguish between the elements such terms describe. Thus, these terms are not necessarily intended to indicate temporal or other prioritization of such elements.

It should be appreciated by those skilled in the art that any block diagrams herein represent conceptual views of illustrative hardware embodying the principles of the aspects.

While each of the embodiments are described above in terms of their structural arrangements, it should be appreciated that the aspects also cover the associated methods of using the embodiments described above.

Unless otherwise indicated, all numbers expressing parameter values and so forth used in the specification and claims are to be understood as being modified in all instances by the term "about." Accordingly, unless indicated to the contrary, the numerical parameters set forth in this specification and attached claims are approximations that may vary depending upon the desired properties sought to be obtained by embodiments of the present disclosure. As used herein, "about" may be understood by persons of ordinary skill in the art and can vary to some extent depending upon the context in which it is used. If there are uses of the term which are not clear to persons of ordinary skill in the art, given the context in which it is used, "about" may mean up to plus or minus 10% of the particular term.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

The invention claimed is:

1. A method of roaming for a non-access point (non-AP) device with a roaming access point (AP) multi-link device (MLD), wherein the roaming AP MLD includes a plurality of AP MLDs in different devices at different locations having one medium access control (MAC) service access point (SAP), comprising:

exchanging management frames between the non-AP device and a current serving AP MLD that is one of the plurality of AP MLDs to select a future serving AP MLD that is one of the plurality of AP MLDs and to select future serving link of the future serving AP MLD; and exchanging management frames between the non-AP device and one or more of the current serving AP MLD and future serving AP MLD to switch from the current serving AP MLD to the future serving AP MLD;

wherein the exchanged management frames are a link reconfiguration request frame transmitted by the non-AP device and a link reconfiguration response frame transmitted by the roaming AP MLD;

wherein a Common Info subfield of a Basic Multi-Link element in the link reconfiguration response frame includes a Roaming AP MLD medium access control (MAC) Address and a AP MLD Roaming ID; and wherein a Presence Bitmap subfield of a Multi-Link Control field of the Basic Multi-Link element includes a Roaming AP MLD MAC Address Present indicator and an AP MLD Roaming ID Present indicator.

2. The method of claim 1, wherein selecting the future serving AP MLD is initiated by the non-AP device.

3. The method of claim 1, wherein selecting the future serving AP MLD is initiated by the current serving AP MLD.

4. The method of claim 1, wherein the link reconfiguration request frame and the link reconfiguration response frame are transmitted through the current serving AP MLD to the roaming AP MLD.

5. The method of claim 1, wherein the link reconfiguration request frame and the link reconfiguration response frame are transmitted through the future serving AP MLD to the roaming AP MLD.

6. The method of claim 1, wherein the link reconfiguration request frame is transmitted through the current serving AP MLD to the roaming AP MLD, and the link reconfiguration response frame is transmitted through the current serving AP MLD to the roaming AP MLD.

7. The method of claim 1, wherein the link reconfiguration request frame is transmitted through the current serving AP MLD to the roaming AP MLD, and the link reconfiguration response frame is transmitted through the future serving AP MLD to the roaming AP MLD.

8. The method of claim 1, wherein the link reconfiguration request frame and the link reconfiguration response frame are transmitted through the current serving AP MLD or the future AP MLD to the roaming AP MLD.

9. The method of claim 1, wherein the exchanged management frames are basic service set (BSS) transitions management (BTM) Query, BTM Request, and BTM Response frames.

10. The method of claim 9, wherein the BTM Query, BTM Request, and BTM Response frames carry neighbor AP MLD information and neighbor AP MLD affiliation information regarding the AP MLD's affiliation with the roaming AP MLD and a roaming MLD MAC address.

11. The method of claim 1, wherein the link reconfiguration request and link reconfiguration response exchange are configured to carry out one of a target wakeup time (TWT) negotiation, traffic identifier (TID)-to-Link mapping negotiation, block acknowledge (BA) agreement negotiation, and emergency preparedness communications service (EPCS) information enablement with the future serving AP MLD.

12. The method of claim 1, wherein the link reconfiguration request and and link reconfiguration response exchange are configured to carry out a TWT negotiation, traffic identifier (TID)-to-Link mapping negotiation, block acknowledge (BA) agreement negotiation, and emergency preparedness communications service (EPCS) information enablement with the future serving AP MLD.

13. The method of claim 1, wherein the exchanged management frames transfer a context of the current AP MLD to the future AP MLD, wherein the context includes one of pairwise transient key (PTK), current sequence number, reorder buffer information, transmit buffer information, emergency preparedness communications service (EPCS) information, traffic identifier (TID) information, and block acknowledge (BA) agreement information.

14. A method of roaming for a non-access point (non-AP) device with a roaming access point (AP) multi-link device (MLD), wherein the roaming AP MLD includes a plurality of AP MLDs in different devices at different locations having one medium access control (MAC) service access point (SAP), comprising:

exchanging management frames between the non-AP device and a current serving AP MLD that is one of the plurality of AP MLDs to select a future serving AP MLD that is one of the plurality of AP MLDs and to select future serving link of the future serving AP MLD; and exchanging management frames between the non-AP device and one or more of the current serving AP MLD and future serving AP MLD to switch from the current serving AP MLD to the future serving AP MLD; wherein the exchanged management frames are a link reconfiguration request frame transmitted by the non-AP device and a link reconfiguration response frame transmitted by the roaming AP MLD;

wherein the exchanged management frames are a link reconfiguration request frame transmitted by the non-AP device and a link reconfiguration response frame transmitted by the roaming AP MLD, and a Common Info subfield of a Reconfiguration Multi-Link element in the link reconfiguration request frame includes a Roaming AP MLD medium access control (MAC) Address and a AP MLD Roaming ID; and wherein a Presence Bitmap subfield of a Multi-Link Control field of the Reconfiguration Multi-Link element includes a Roaming AP MLD MAC Address Present indicator and an AP MLD Roaming ID Present indicator.

15. A roaming access point (AP) multi-link device (MLD), wherein the roaming AP MLD includes a plurality of AP MLDs in different devices at different locations having one medium access control (MAC) service access point (SAP), comprising a processor configured to:

exchange management frames between the non-AP device and a current serving AP MLD that is one of the plurality of AP MLDs to select a future serving AP MLD that is one of the plurality of AP MLDs and to select future serving link of the future serving AP MLD; and exchange management frames between the non-AP device and one or more of the current serving AP MLD and future serving AP MLD to switch from the current serving AP MLD to the future serving AP MLD;

wherein a Common Info subfield of a Basic Multi-Link element in the link reconfiguration response frame includes a Roaming AP MLD medium access control (MAC) Address and a AP MLD Roaming ID; and wherein a Presence Bitmap subfield of a Multi-Link Control field of the Basic Multi-Link element includes a Roaming AP MLD MAC Address Present indicator and an AP MLD Roaming ID Present indicator.

16. The device of claim 15, wherein selecting the future serving AP MLD is initiated by the non-AP device.

17. The device of claim 15, wherein selecting the future serving AP MLD is initiated by the current serving AP MLD.

* * * * *